US012115438B2

(12) United States Patent
Shigeta

(10) Patent No.: US 12,115,438 B2
(45) Date of Patent: Oct. 15, 2024

(54) CARD DISCARDING DEVICE FOR TABLETOP GAME

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 15/518,573

(22) PCT Filed: Oct. 14, 2015

(86) PCT No.: PCT/JP2015/005196
§ 371 (c)(1),
(2) Date: Apr. 12, 2017

(87) PCT Pub. No.: WO2016/059796
PCT Pub. Date: Apr. 21, 2016

(65) Prior Publication Data
US 2017/0274272 A1 Sep. 28, 2017

(30) Foreign Application Priority Data
Oct. 14, 2014 (JP) ................................ 2014-223628

(51) Int. Cl.
*A63F 1/06* (2006.01)
*A63F 1/10* (2006.01)
(Continued)

(52) U.S. Cl.
CPC .................. *A63F 1/06* (2013.01); *A63F 1/10* (2013.01); *A63F 1/12* (2013.01); *G07F 17/32* (2013.01)

(58) Field of Classification Search
CPC ...... A63F 1/06; A63F 1/08; A63F 1/10; A63F 1/12; A63F 1/14; A63F 1/16; A63F 1/18; G07F 17/32
(Continued)

(56) References Cited

U.S. PATENT DOCUMENTS 529,228 A * 11/1894 Wyler ....................... A63F 1/18 273/148 R
5,605,334 A 2/1997 McCrea, Jr.
(Continued)

FOREIGN PATENT DOCUMENTS

AU 2011294601 A1 1/2013
CA 2689118 A1 12/2008
(Continued)

OTHER PUBLICATIONS

International Search Report, mailed Nov. 17, 2015, for PCT International Application No. PCT/JP2015/005196, filed Oct. 14, 2015.
(Continued)

*Primary Examiner* — Joseph B Baldori
(74) *Attorney, Agent, or Firm* — NORTON ROSE FULBRIGHT US LLP

(57) ABSTRACT

A card disposal apparatus, including an ejection port for disposing of cards after the game, a disposal card receiving board that receives the cards from the ejection port, disposal card information acquisition means that acquires information about number (rank) from the cards put in the ejection port, group information acquisition means that acquires group information from the cards to be disposed of, a counter for the cards as number count means that counts the number of the disposal cards put in the ejection port, deck check means that checks whether all cards to be disposed of are complete in terms of 52×8 decks=416 in the case of a set of 8 decks of cards, and output means that outputs a check
(Continued)

result. Void holes are provided on the cards to be disposed of, and ensure that the cards are perfectly disposed of without being unfairly reused.

22 Claims, 9 Drawing Sheets

(51) Int. Cl.
*A63F 1/12* (2006.01)
*G07F 17/32* (2006.01)

(58) Field of Classification Search
USPC .......................................... 273/148 A, 149 R
See application file for complete search history.

(56) References Cited

U.S. PATENT DOCUMENTS

| | | | | |
|---|---|---|---|---|
| 6,267,248 | B1 * | 7/2001 | Johnson | A63F 1/12 209/509 |
| 6,676,127 | B2 * | 1/2004 | Johnson | A63F 1/12 273/149 P |
| 6,726,205 | B1 * | 4/2004 | Purton | A63F 1/14 273/148 R |
| 7,510,186 | B2 * | 3/2009 | Fleckenstein | A63F 1/12 273/149 R |
| 7,959,153 | B2 * | 6/2011 | Franks, Jr. | A63F 1/06 273/148 R |
| 8,074,987 | B2 * | 12/2011 | Soltys | A63F 1/14 273/149 R |
| 8,342,533 | B2 * | 1/2013 | Fleckenstein | A63F 1/18 273/148 A |
| 8,485,527 | B2 * | 7/2013 | Sampson | A63F 1/12 273/149 R |
| 8,998,210 | B2 * | 4/2015 | Shigeta | A63F 1/14 273/148 R |
| 9,403,082 | B2 * | 8/2016 | Shigeta | A63F 1/14 |
| 9,827,484 | B2 * | 11/2017 | Shigeta | A63F 1/00 |
| 10,220,300 | B2 * | 3/2019 | Shigeta | A63F 1/06 |
| 10,252,147 | B2 * | 4/2019 | Shigeta | G07F 17/3293 |
| 10,279,245 | B2 * | 5/2019 | Sampson | A63F 1/12 |
| 10,675,530 | B2 * | 6/2020 | Shigeta | G07F 17/3293 |
| 10,874,934 | B2 * | 12/2020 | Shigeta | G07F 17/322 |
| 11,517,808 | B2 * | 12/2022 | Rouillard | G06K 19/07 |
| 11,615,679 | B2 * | 3/2023 | Shigeta | G07F 17/322 273/148 R |
| 2002/0017481 | A1 * | 2/2002 | Johnson | A63F 1/12 209/547 |
| 2005/0026681 | A1 | 2/2005 | Grauzer et al. | |
| 2005/0113166 | A1 * | 5/2005 | Grauzer | A63F 1/14 463/29 |
| 2005/0206076 | A1 | 9/2005 | Ohira | |
| 2007/0060260 | A1 | 3/2007 | Fleckenstein | |
| 2007/0273094 | A1 | 11/2007 | Fleckenstein | |
| 2008/0001356 | A1 * | 1/2008 | Franks | A63F 1/06 273/148 R |
| 2008/0303210 | A1 | 12/2008 | Grauzer et al. | |
| 2010/0314834 | A1 * | 12/2010 | Shigeta | A63F 1/18 273/293 |
| 2013/0026709 | A1 | 1/2013 | Sampson et al. | |
| 2013/0307215 | A1 * | 11/2013 | Shigeta | A63F 1/14 273/149 R |
| 2014/0033660 | A1 * | 2/2014 | Shigeta | A63F 1/14 206/315.1 |
| 2015/0196835 | A1 * | 7/2015 | Shigeta | A63F 1/14 273/148 A |
| 2019/0118072 | A1 * | 4/2019 | Shigeta | G06F 7/58 |

FOREIGN PATENT DOCUMENTS

| | | | |
|---|---|---|---|
| CN | 1822887 | A | 8/2006 |
| CN | 101172273 | A | 5/2008 |
| CN | 101244336 | A | 8/2008 |
| CN | 201701726 | U | 1/2011 |
| CN | 103025393 | A2 | 4/2013 |
| CN | 103418128 | A | 12/2013 |
| JP | 2006189957 | A | 7/2006 |
| NZ | 731040 | | 6/2018 |
| WO | 2013172038 | A1 | 11/2013 |

OTHER PUBLICATIONS

Extended European Search Report dated May 17, 2018 for EP Patent Application No. 15851546.0.
Allowance dated Oct. 19, 2018 for KR Patent Application No. 10-2017-7010083.
Further Examination Report dated Nov. 2, 2018 for NZ Patent Application No. 739365.
Chinese Office Action dated Dec. 4, 2019 issued in corresponding CN application 201580055583.0.
Korean Notice of Allowance dated Nov. 18, 2021 issued in corresponding KR application 10-2019-7002073.
Chinese Office Action dated Apr. 19, 2024 issued in corresponding CN Application 202110280426.7.
Chinese Office Action dated Nov. 10, 2023 issued in corresponding CN Application 202110281011.1.

* cited by examiner

CARD DISCARDING DEVICE FOR TABLETOP GAME

CROSS REFERENCE TO RELATED APPLICATIONS

This application is a national-phase application under 35 U.S.C. § 371 of PCT Application PCT/JP2015/005196, filed Oct. 14, 2015, which claims priority to Japanese Application No. 2014-223628, filed Oct. 14, 2014. The contents of each of these applications are herein expressly incorporated by reference.

TECHNICAL FIELD

The present invention relates to a card disposal apparatus for a table game that has a function to prevent cards used in a card game from being unfairly taken out and to detect whether a predetermined number of cards have been surely disposed of, and particularly, to an apparatus that allows cards that should be disposed of, to be surely contained in a disposal card stocker.

BACKGROUND ART

There is a possibility of an unfair behavior in which cards are swapped on a game table during a game for achieving a self-advantageous game. International Publication No. WO 2013/172038 discloses a prevention apparatus against this kind of unfair behavior. In the literature, determination is made as to whether the number of the cards having appeared in the table game coincides with the number of the cards used in each game. The cards having appeared in the table game are put in an ejection port, and void holes or cutouts are provided on the used cards. The void cards are received by a disposal card carton, and are disposed of (Patent Literature 1).

In the case where the void holes or the cutouts are provided on the cards used in the table game and the void cards are received by an individual disposal card carton and are disposed of, there is a problem in that a labor is required for the exchange of the carton and the disposal for each carton, and a labor is required for a management under which the disposal for each carton is surely performed.

CITATION LIST

Patent Literature

Patent Literature 1: International Publication No. WO 2013/172038

SUMMARY OF INVENTION

Technical Problem

The conventional apparatus confirms whether cards equivalent to a predetermined number of decks contained in a dealing shoe on the game table (for example, in the case of using 8 decks, the number of the cards is 52×8 decks=416) are complete. Then, the cards are put in the disposal card carton and are disposed of. Therefore, there is a problem in that a labor is required for the exchange of the carton and the disposal for each carton, and a labor is required for a management for each carton under which the disposal for each carton is surely performed.

The present invention has been made in such a context, and an object of the present invention is to provide a card disposal apparatus that has a structure of checking whether the cards to be disposed of after the use on the game table are complete in terms of a predetermined number (for example, in the case of using 8 decks, the predetermined number is 52×8 decks=416), and then making the cards to be sequentially contained in multiple pockets of a disposal card stocker of the card disposal apparatus, and that realizes an absolute disposal operation by the multiple pockets partitioned by multiple partitions. Further, for avoiding the cards from being reused after the number check, the disposal card stocker includes a locking device. Thereby, it is possible to absolutely prohibit an unfair reuse of the cards.

Solution to Problem

For solving the conventional problem, a card disposal apparatus in the present invention is a card disposal apparatus that disposes of cards dealt on a game table from a dealing shoe, after use in a game, the card disposal apparatus including:

an ejection port that receives the cards to be disposed of;

a counter that counts and stores the number of the cards received through the ejection port;

a disposal card stocker that receives the cards put in the ejection port; and deck check means that determines whether all cards put in the ejection port are complete in terms of a number equivalent to a predetermined number of decks, the disposal card stocker including multiple pockets that are partitioned by multiple partitions, each of the pockets having a structure capable of sequentially receiving cards that are dealt from the dealing shoe, that are used in the game and that are collected, and capable of receiving all cards that remain in the dealing shoe without being used, the deck check means totally counting the number of cards that are used in each game and that are counted by the counter and the number of the cards that remain in the dealing shoe without being used, and determining whether the disposed cards are complete in terms of the number equivalent to the predetermined number of decks, the multiple pockets of the disposal card stocker having structures capable of moving relative to a main body of the apparatus and capable of receiving different sets of cards respectively, and further having structures of being detachable from the main body of the apparatus.

Advantageous Effects of Invention

The card disposal apparatus for the table game in the present invention provides a card disposal apparatus that does not require the management of an individual carton because of the multiple pockets partitioned by the multiple partitions, and that realizes an absolute disposal operation of the cards that should be disposed of. Further, for avoiding the cards from being reused after the number check, the disposal card stocker includes a locking device. Thereby, it is possible to absolutely prohibit an unfair reuse of the cards.

BRIEF DESCRIPTION OF DRAWINGS

FIG. 4 is a diagram showing a relation between a code constituted of marks M printed as card information and output waveforms of two UV sensors of a card information acquisition sensor.

DESCRIPTION OF EMBODIMENTS

Embodiment 1

Figure 1:
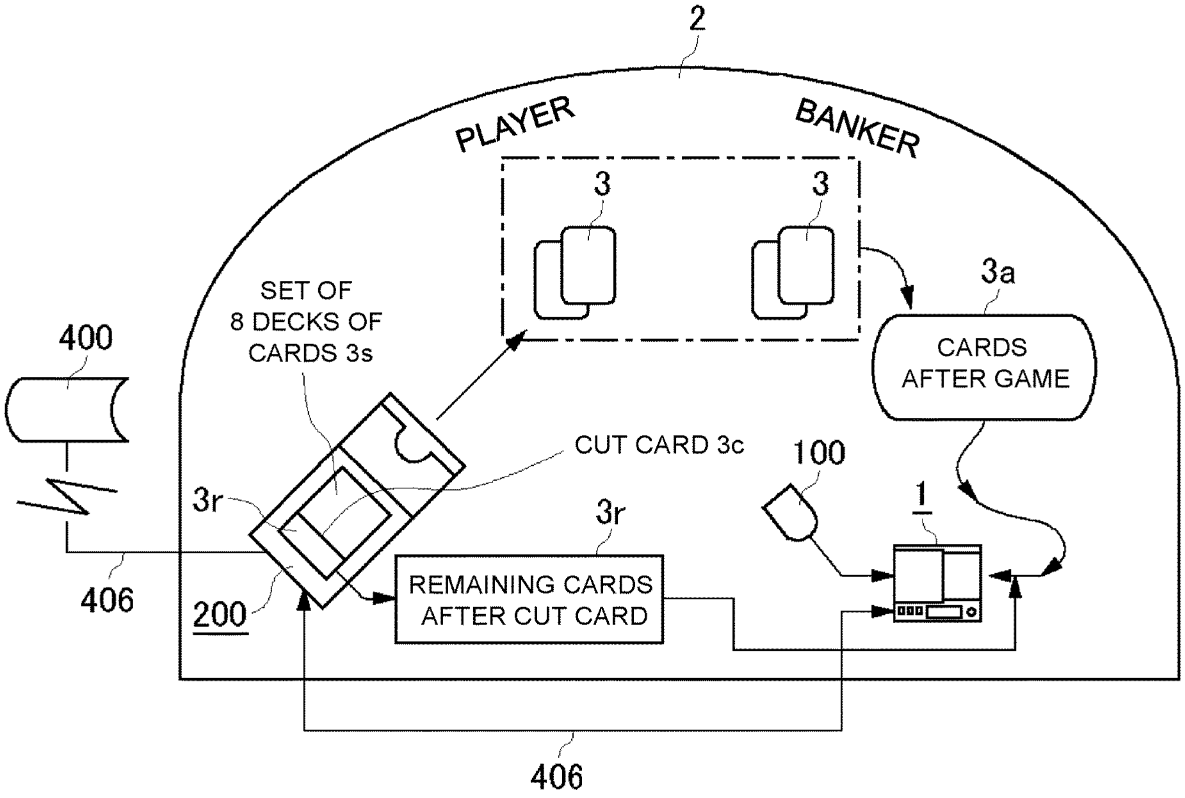
FIG. 1 is a plan view of a table game system in an embodiment of the present invention.

Embodiment 1 of the present invention will be described with reference to the drawings. In FIG. 1, a card disposal apparatus 1 that is a card disposal apparatus for a table game in Embodiment 1 of the present invention is provided on a game table 2 or is arranged on a side surface of the game table 2. The game table 2 shown in FIG. 1, which is shown in a simplified figure, is a game table for an ordinary baccarat game. As is well known, the baccarat game is played by a player and a banker. On the game table 2, a dealing shoe 200 is provided. The dealing shoe 200 is a source of card 3, and the cards 3 fed from the dealing shoe 200 are dealt to the player. Then, after the finish of a game, the disposal process for the cards 3 is performed by the card disposal apparatus 1. Embodiment 1 is a card disposal apparatus that disposes of the cards 3 contained in the dealing shoe 200 placed on the game table 2 and manually dealt on the game table 2 by a dealer or the like, after the use in the game, and is a card disposal apparatus including, as basic constituents, a set of multiple decks of cards 3 (ordinarily, 6, 8 or 12 decks) contained in the dealing shoe 200 and the card disposal apparatus 1 that disposes of collected cards 3*a*.

Figure 2:
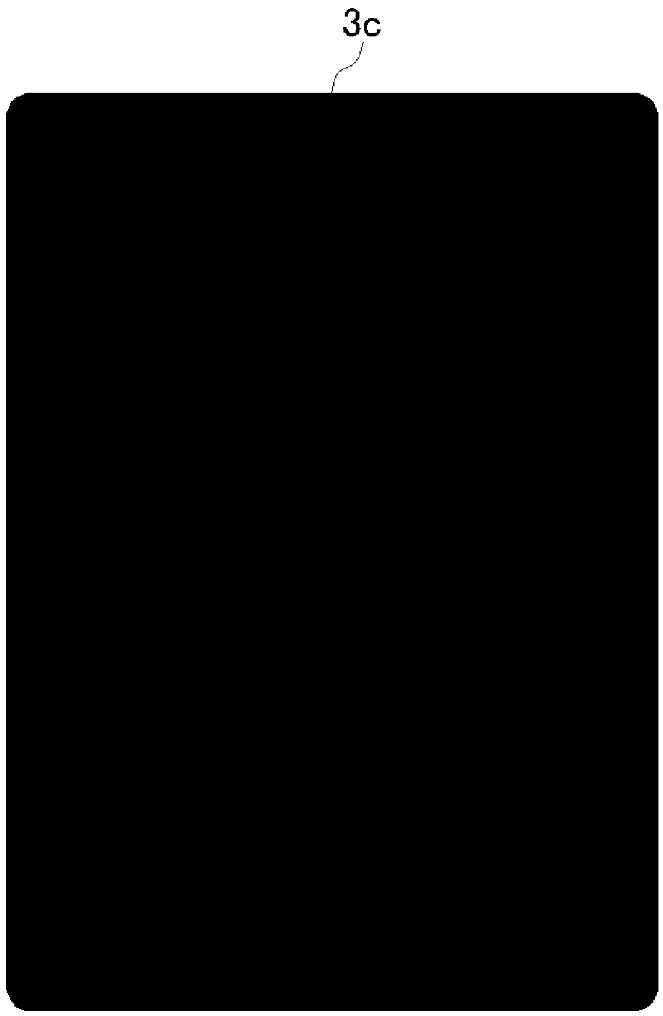
FIG. 2 is a plan view of a cut card in the embodiment of the present invention.
Figure 3:
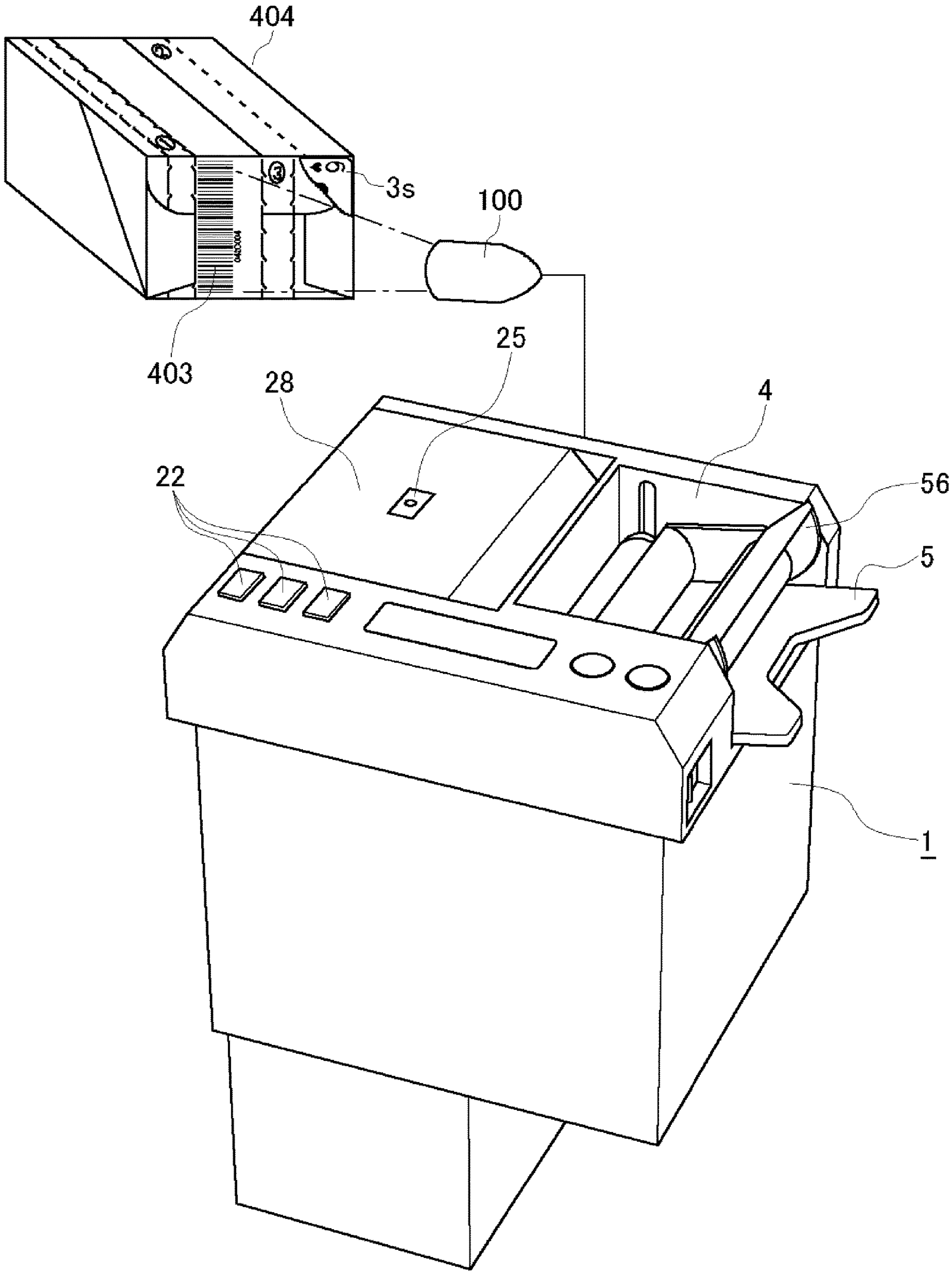
FIG. 3 is a perspective view of a card disposal apparatus of the table game system in the embodiment.
Figure 4:
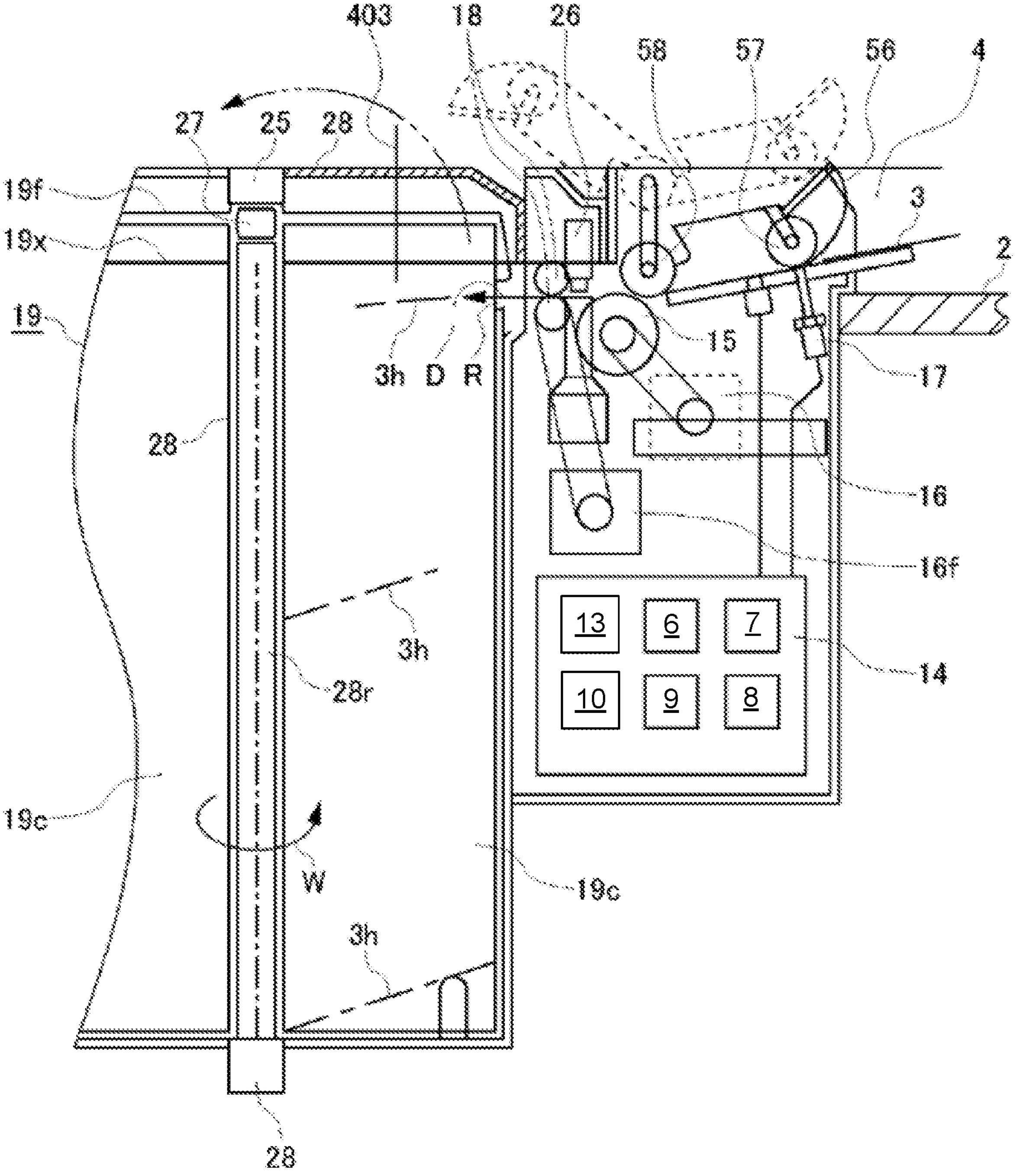
FIG. 4 is a sectional side view of the card disposal apparatus in the embodiment of the present invention.

A cut card 3*c* is inserted into a set 3*s* of the cards 3 before the setting in the dealing shoe 200 on the game table 2. The cut card 3*c* is inserted into a latter part (the rest is about one-fourth or one-fifth) of the set 3*s* of the cards 3, when the set 3*s* of the cards 3 is used in the game, and is used for finishing the game on the game table 2 in a state where about 20 to 40 cards 3 remain in the dealing shoe 200, in order to prevent the player from predicting the ranks of a small number of remaining cards by counting the ranks of the cards dealt during the game (see FIG. 1). FIG. 2 shows a plan view of the cut card 3*c*.

The card disposal apparatus 1 has a structure capable of sequentially receiving the cards 3*a* that are used in each game and that are collected, and receiving all cards 3*r* that remain in the dealing shoe 200 without being used, when the game is stopped at a predetermined timing after the cut card 3*c* appears from the dealing shoe 200 (at a timing of the finish of the next game or 2-3 games after the cut card 3*c* is drawn). The card disposal apparatus 1, with card desk check means described later, totally counts the number of the cards 3*a* after the use in each game and the number of the cards 3*r* that are not used and remain in the dealing shoe 200 after the cut card 3*c* appears from the dealing shoe 200, and determines whether all disposed cards are complete in terms of the number equivalent to the predetermined number of decks.

Next, the detail of the card disposal apparatus 1 will be described with FIGS. 3 to 7. The card disposal apparatus 1 includes an ejection port 4 for disposing of the cards 3*a* after the game that are dealt on the game table 2 for each game. The card disposal apparatus 1 is configured to include a disposal card receiving board 5 that receives the disposal-target cards 3*a* from the ejection port 4, disposal card information acquisition means 6 that acquires the information about number (rank) and kind (suit) from the cards 3*a* put in the ejection port 4, group information acquisition means 7 that acquires group information from the disposal cards 3*a*, a counter 8 for the cards as count means that counts the number of the disposal cards 3*a* put in the ejection port 4, authenticity determination means 9 that compares the group information of the cards acquired by the group information acquisition means 7 to predetermined group information, and determines whether the group information of the cards coincides with the predetermined group information, and output means 10 that outputs the determination result by the determination means. The card disposal apparatus 1 includes deck check means 13 that integrates the information acquired by the disposal card information acquisition means 6 and the information of the counter 8, measures the number of the cards 3 at least for each number (rank), and determines whether the number of the cards 3 put in the ejection port 4 is complete in terms of a predetermined number. The card disposal apparatus 1 includes a control device 14 that controls the whole operation, and each means described above is arranged in the control device 14, to control each operation. The control device 14 is constituted by electronic circuits including a microcomputer, a memory and the like, and includes constituents of an ordinary computer, as exemplified by a CPU, a ROM and a RAM. By executing a program stored in memories such as the ROM, the control device 14 controls the whole of the apparatus, and performs necessary processes.

Figure 5C:
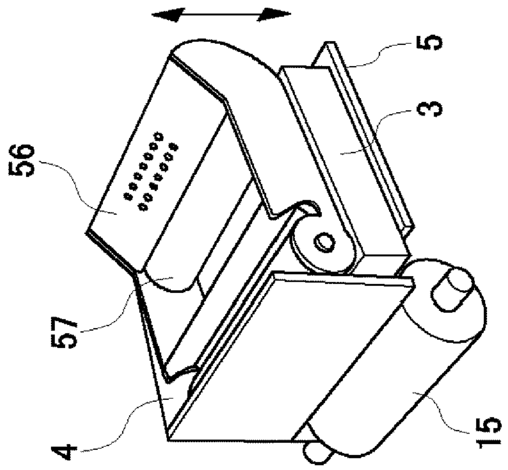
FIG. 5A, FIG. 5B and FIG. 5C are perspective views showing the function of a weight of the card disposal apparatus.
Figure 5B:
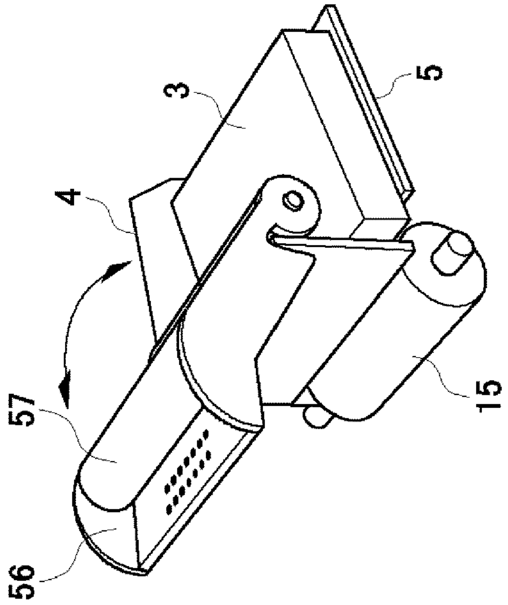
Figure 5A:
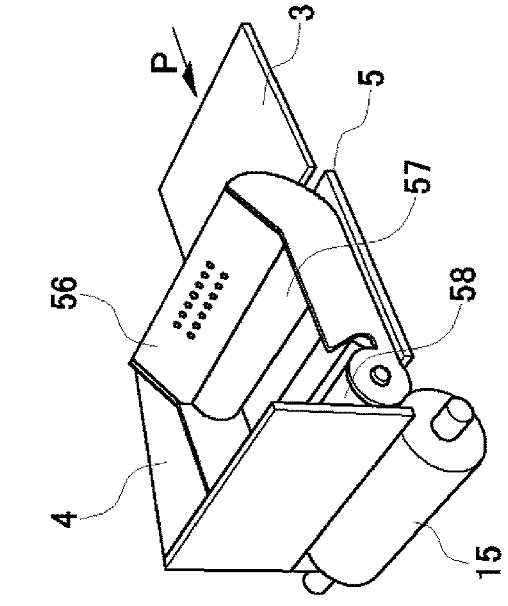
Figure 6:
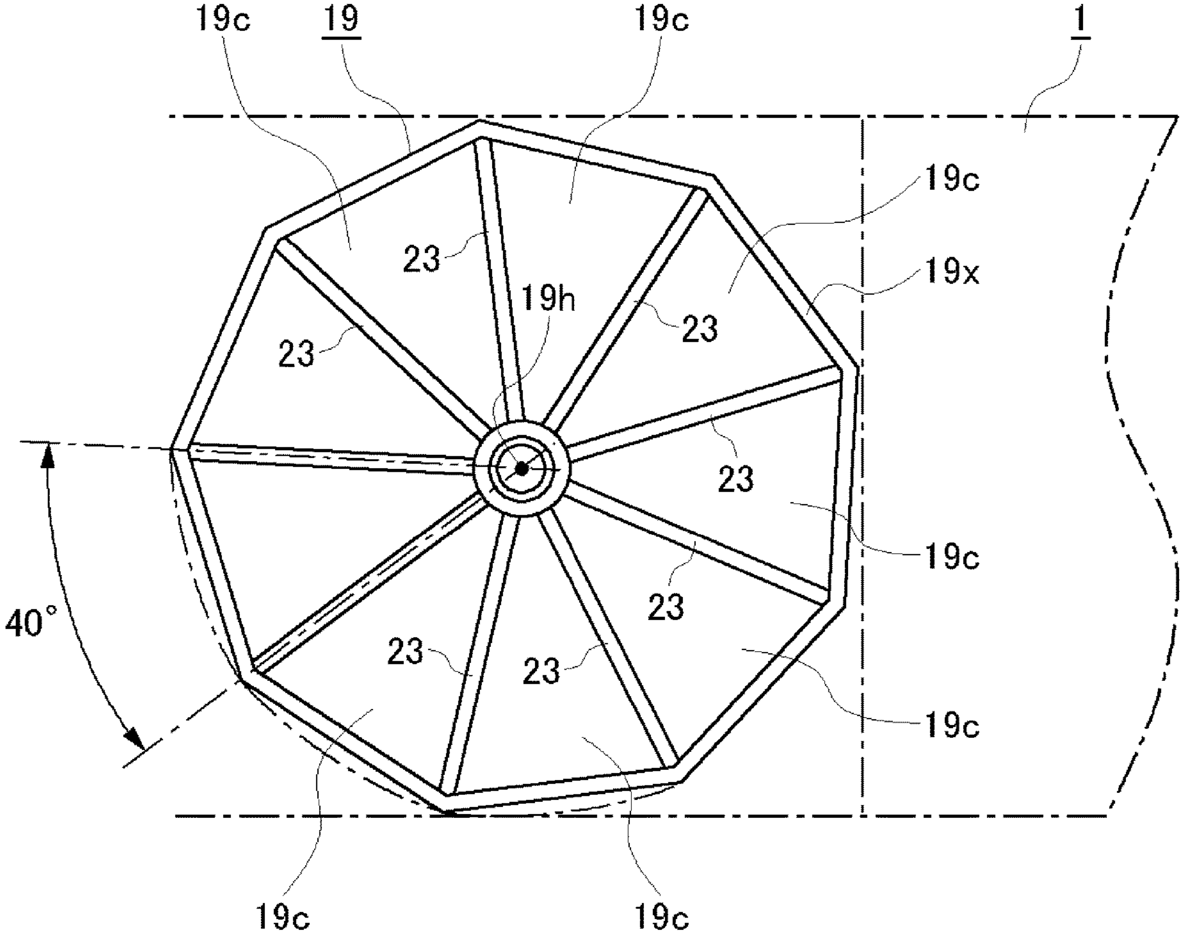
FIG. 6 is a plan view of a state where a lid of the disposal card stocker in the embodiment is removed.
Figure 7:
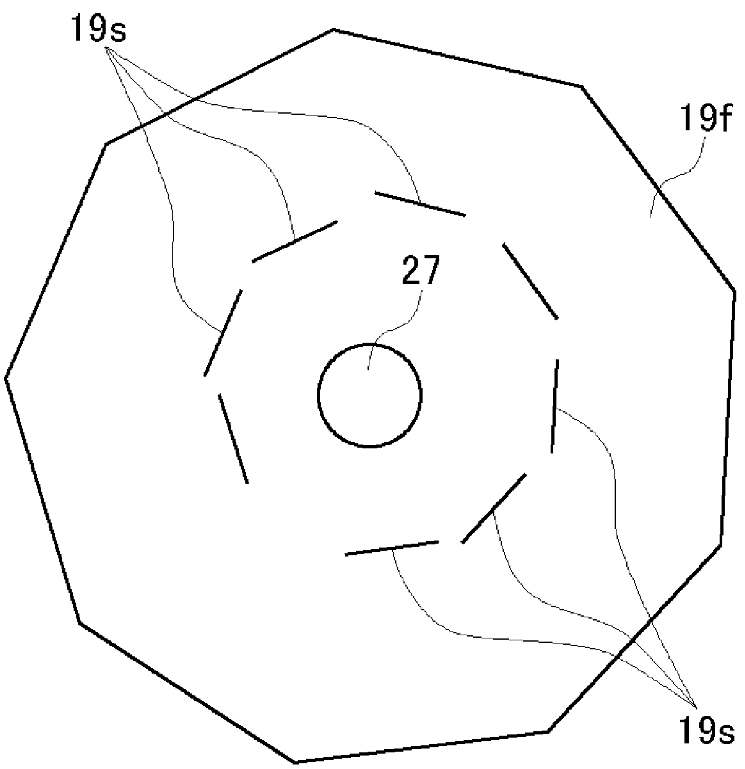
FIG. 7 is a plan view of the lid of the disposal card stocker in the embodiment.

The detail of the card disposal apparatus 1 will be further described. The cards 3 after the use in the game are inserted into the ejection port 4, and are disposed of. A weight 56 is arranged above the disposal card receiving board 5 that receives the disposal-target cards 3. The weight 56 is provided for pressing the cards 3 onto the disposal card receiving board 5 and assisting in surely feeding the cards 3 toward a feeding roller 15, even when the disposal-target cards 3 are folded during the game, and is configured to press both ends of the cards 3 downward by weight rollers 57, 58. Although the ejection port 4 receives the cards 3 from the direction indicated by an arrow P as shown in FIG. 5A, the weight 56 has a structure capable of moving upward (this state is shown in FIGS. 5B and 5C) such that the cards 3 in a bundle state can be also received.

The feeding roller 15 for feeding, one by one, the disposal cards 3 placed on the disposal card receiving board 5 by hand is provided below the disposal card receiving board 5. The feeding roller 15 is rotated and driven by a drive motor 16. As the drive motor 16, a stepping motor is used. When the cards 3 are placed on the disposal card receiving board 5, a card sensor 17 detects this, the control device 14 controls the drive motor 16, and the feeding roller 15 rotates. In this way, the cards 3 on the disposal card receiving board

5 are fed by the feeding roller 15. The cards 3 fed from the feeding roller 15 are further transferred toward the direction (arrow D) of a disposal card stocker 19, by a pair of transferring rollers 18. The transferring rollers 18 are driven and controlled by a transferring motor 16*f*, and the driving speed is set such that the cards 3 are transferred at a higher speed than a speed at which the cards 3 are transferred by the feeding roller 15. Therefore, the cards 3 are surely transferred in the direction (arrow D) of the disposal card stocker 19, such that the cards 3 are pulled by the transferring rollers 18. The cards 3 to be transferred pass through a group information acquisition sensor 20 and two card information acquisition sensors 21 in the middle of the transfer, and here, the information of the cards 3 are detected and acquired.

The group information acquisition sensor 20 is connected with the group information acquisition means 7 that acquires the group information from the cards 3. The card information acquisition sensor 21 is connected with the disposal card information acquisition means 6 that acquires the information about the number (rank) from the cards 3, and the information about the number (rank) is acquired. The cards 3 to be transferred to the disposal card stocker 19 are detected by the counter 8 connected with the card sensor 17, and the number of the passing cards 3 is counted. The signal of the group information acquisition sensor 20 is transmitted to the group information acquisition means 7. The authenticity determination means 9 compares the group information of the card 3 acquired by the group information acquisition means 7, to the predetermined group information that is previously stored, and determines whether the group information of the card 3 coincides with the predetermined group information. When the group information of the card 3 does not coincide with the predetermined group information, the authenticity determination means 9 determines that the card 3 is a fake card, and the control device 14 lights an indication lamp 22 through the output means 10 that outputs the determination result, and sends the existence of the fake card to a management division 400 or the like of a casino or the like, through a communication line 406.

When the authenticity determination means 9 determines that the card 3 is a fake card, the control device 14 transmits the information to void means 26, and the void means 26 punches, in the card 3, one or two special void holes H indicating that the card 3 is abnormal. The card 3 after the determination by the authenticity determination means 9 is transferred to the disposal card stocker 19 through an opening 19M. The card disposal apparatus 1 has a disposal card passage structure that is closed such that the card cannot be taken off until the card 3 reaches a pocket 19*c* for the disposal card in the disposal card stocker 19. The card 3*h* to be disposed of, in which the void hole H is punched in order to avoid the use for another purpose, falls in the pocket 19*c* for the disposal card, together with void waste.

When the card 3 is transferred toward the disposal card stocker 19, the card information acquisition sensor 21 and the group information acquisition sensor 20 each acquire the information. After the determination that the card 3 is an authentic card, the void means 26 bores the void hole H allowing the card 3 not to be used afterward, in the card 3. Therefore, the card 3 to be transferred toward the disposal card stocker 19 passes through the void means 26. The void means 26 bores the void hole H in the card 3, by hole boring means (a punch and die, or the like). The card 3*h* having the void hole H bored falls in the pocket 19*c* for the disposal card in the disposal card stocker 19. Although the void hole H is bored by the void means 26 in the embodiment, a cutout may be provided at a corner of the card 3, or a void mark may be given by printing means using a known stamp of laser. Thus, for avoiding the reuse of the card after the disposal process and the check, the void hole or the void mark is provided on the card, so that an unfair reuse of the card is absolutely prohibited.

The disposal card stocker 19 is provided with a lid 19*f* that allows the disposal card 3*h* to be taken off afterward. The lid 19*f* is provided with disposal card locking means 27, which prevents the disposal card 3*h* from being unfairly taken off during the movement of the disposal card stocker 19. When the disposal card stocker 19 is detached from the main body of the card disposal apparatus 1, a cover 28 for takeoff, which is provided at an upper part of the card disposal apparatus 1, is opened. The cover 28 is provided with an unfair-behavior prevention device 25 that restricts the operation of the cover 28, and the control device 14 controls the unfair-behavior prevention device 25 such that only an authorized operator can open the cover 28 using a key or the like. The disposal card locking means 27 performs the lock control of the opening and closing of the lid 19*f*, so that only the authorized operator can open the lid 19*f* using the key or the like, and prevents an unfair takeoff of the disposal card 3*h* from the disposal card stocker 19. The shape of the lid 19*f* is designed such that an interspace R is made between the main body side and lid 19*f* of the disposal card stocker 19, for allowing the card 3*h* transferred by the transferring rollers 18 to be received and put in the pocket 19*c*.

Next, the deck check means 13 will be described. Ordinarily, multiple decks (4, 6 or 8 decks) of cards are set in the dealing shoe 200 (electronic shoe) placed on the game table 2. The set 3*s* of the cards is given in a state (package 404) where the multiple decks of cards are shuffled and packed, and each different bar code 403 is provided on the package 404 (see FIG. 3). From the bar code 403, the ID information identifying an individual set 3*s* of cards is read by a reading device 100 arranged on the game table 2, and from the ID information, the set 3*s* of cards to be used in the game is identified. Then, the set 3*s* of cards is set in the dealing shoe 200, and is given for each game. In the set 3*s* of cards set in the dealing shoe 200, all cards are not used. At the beginning of each game, the cut card (reference character 3*c* in FIG. 2) is inserted into the set 3*s* of multiple decks (4, 6 or 8 decks) of cards, for a reason of the security of the game. When the cut card 3*c* appears, the remaining cards 3*r* in the dealing shoe 200 are not used any more. All the remaining cards 3*r* are put in the ejection port 4 for disposal.

All the remaining cards 3*r* are put in the ejection port 4 for disposal, and from the remaining cards 3*r*, the information about the number (rank) is acquired by the disposal card information acquisition means 6. The deck check means 13 integrates the information of the counter 8 for the cards as the count means, with the information about the number (rank) acquired from the remaining cards 3*r* by the disposal card information acquisition means 6 and at least the information about the number (rank) acquired from each card 3*a* already used in each game, and counts the number of the cards for each card number (rank). Then, the deck check means 13 determines whether all cards placed on the game table and put in the ejection port 4 are complete in terms of the number equivalent to the predetermined number of decks for all numbers (ranks) (416 cards, ace to king, 4 kinds×8 decks, for example).

The total number of the cards 3 to be used in the table game (ordinarily, any of 4, 6, 8, 10 and 12 decks) is previously determined in the casino or the like. For example, in the case of 8 decks, the number of the cards 3 is 52×8 decks=416, and 8 cards are used for each card kind having the same suit and rank. In the deck check means 13, the control device 14 determines whether the number of cards is complete for each card kind, and the output means 10 to output the result lights the indication lamp 22 in a color that is different depending on the result. At the same time, communication means 406 sends the count result of the cards 3 to the management division 400 or the like of the casino or the like.

To sum up the cards 3*h* already disposed of in the pocket 19*c* of the disposal card stocker 19 and the cards 3*r* placed collectively on the disposal card receiving board 5 in the ejection port 4 without being used in the game (the cards 3*r* are also preserved in the pocket 19*c* of the disposal card stocker 19), all the cards initially set in the dealing shoe 200, whose number is 52×8 decks=416, are preserved in the pocket 19*c*. In the case of the set 3*s* of 8 decks of cards, the deck check means 13 checks whether 32 cards (416 cards in total) exist for each of the 13 ranks of cards, based on the information acquired from all cards whose number is 52×8 decks=416. In this way, the deck check means 13 confirms that the 416 cards are complete.

The use of the set (for example, 8 decks) of cards in the dealing shoe 200 is finished, and all cards are preserved in the pocket 19*c*, as described above. Thereafter, the bar code 403 attached to the package 404 that packs the set 3*s* of cards for identifying the set 3*s* of cards in the pocket 19*c* is inserted into the pocket 19*c*. In this case, not only the bar code 403 but also the package 404 may be inserted into the pocket 19*c*. When the package 404 and the bar code 403 are inserted into the pocket 19*c*, trash is not made around the table in the casino, and there is an advantage in terms of arrangement. The package 404 and the bar code 403 enter the pocket 19*c* through a slit 28*s* formed on the cover 28 for takeoff and a slit 19*s* provided on the lid 19*f*. The cover 28 for takeoff may have a structure in which the lock is unlocked and the cover 28 is opened upward, and the package 404 and the bar code 403 may enter the pocket 19*c* through the slit 19*s*. Thus, the use of the set (for example, 8 decks) of cards in the dealing shoe 200 is finished, all cards are preserved in the pocket 19*c*, and the bar code 403 used for identifying the set 3*s* of cards is also put in the same pocket 19*c*.

When all cards of the set (for example, 8 decks) in the dealing shoe 200 are preserved in the pocket 19*c* and the bar code 403 is put in, the dealer actuates a rotation device 28 (a stepping motor or the like) through a switch (not illustrated) or the like, and the disposal card stocker 19 rotates around a rotation shaft 28*r* by 40 degrees (arrow W). The disposal card stocker 19 is sectioned such that 9 pockets 19*c* are provided. When the disposal card stocker 19 rotates by 40 degrees (arrow W), an adjacent empty pocket 19*c* (see FIG. 6) is located at a position enabling to receive the next set 3*s* of cards to be disposed of.

The disposal card stocker 19 includes the multiple pockets 19*c* partitioned by multiple partitions, and each of the pockets 19*c* has a size enabling to sequentially receive cards 3*h* (for example, 416 cards) that are dealt from the dealing shoe, that are used in the game and that are collected. Then, when the game is stopped at the predetermined timing, the disposal card stocker 19, in which all cards of the set 3*s* in the dealing shoe 200 and the bar code 403 are put, rotates around the rotation shaft 28*r*, so that the adjacent empty pocket 19*c* reaches the position for receiving the disposal cards 3*h* (the state in FIG. 4). The pockets 19*c* have a structure capable of sequentially receiving sets 3*s* of cards to be disposed of and receiving 9 sets. At the center of the disposal card stocker 19, a shaft hole 19*h* that receives the rotation shaft 28*r* is provided. The disposal card stocker 19 rotates while being guided by the shaft hole 19*h*.

When the disposal card stocker 19 is detached from the main body of the card disposal apparatus 1, the cover 28 for takeoff, which is provided at the upper part of the card disposal apparatus 1, is opened, and the disposal card stocker 19 is taken off upward while being guided by the shaft hole 19*h*. Since the unfair-behavior prevention device 25 that restricts the operation of the cover 28 is provided on the cover 28, only the authorized operator can perform the takeoff. In the card stocker 19 detached from the main body of the card disposal apparatus 1, an open part 19*x* at an upper part is covered with the lid 19*f* (FIG. 7), and therefore, the cards 3*h* to be disposed of cannot be taken off. The disposal card locking means 27 locks the lid 19*f* to the card stocker 19, and only the authorized operator can open the lid 19*f* using the key or the like and can dispose of the disposal cards 3*h*.

Figure 8:
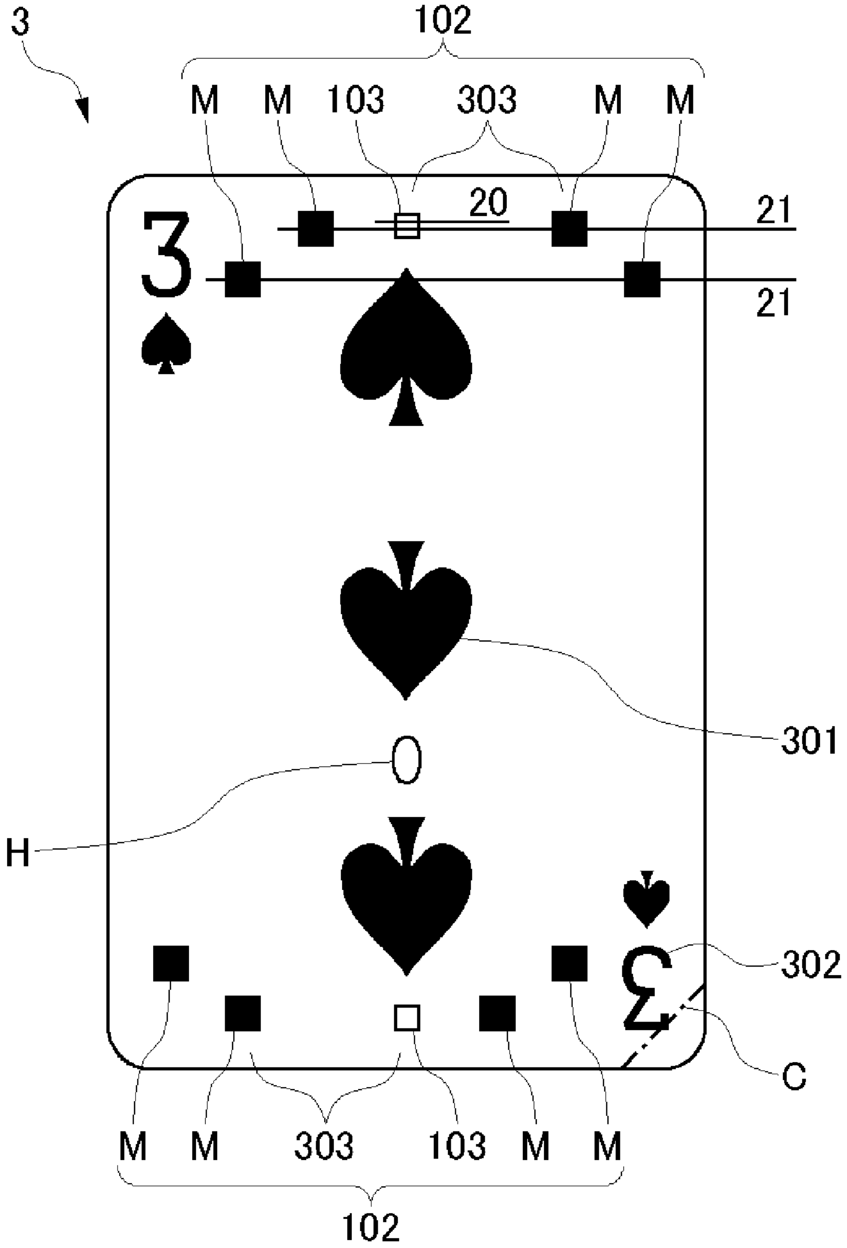
FIG. 8 is a plan view of a card in Embodiment 1 of the present invention.
Figure 9:
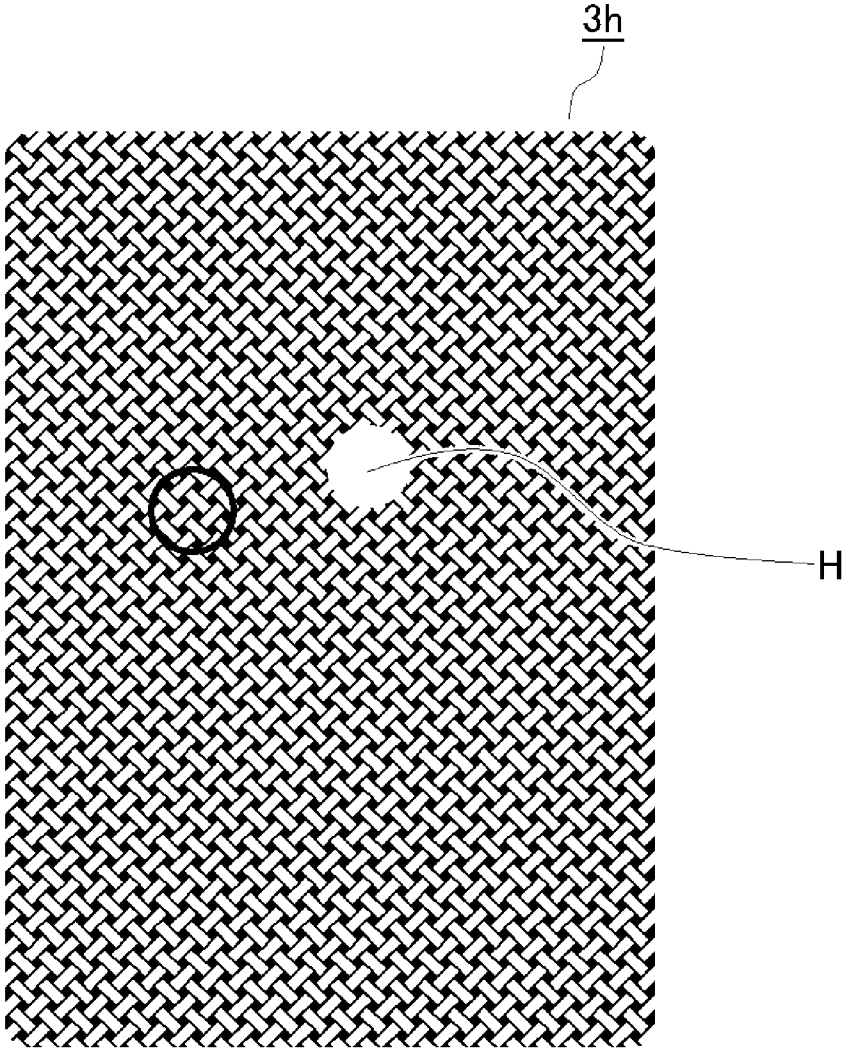
FIG. 9 is a plan view showing a card in a state where a void hole is provided by void means (punch device).

Next, the card 3 to be used in the table game in the embodiment of the present invention will be described with FIG. 8. On the card 3, codes 102 that are codes of the number of the card 3 and that are constituted of ordinarily invisible marks M are provided at the upper side and lower side of the card 3, in a point-symmetric manner. The code 102 is constituted of the combination of the number and arrangement of multiple marks M printed with an infrared light sensitive ink or ultraviolet light sensitive ink that is invisible under daylight. Further, on the card 3, group code information 103 that is a code of the information indicating the authenticity of the card, that is arranged by printing or the like in an ordinarily invisible state (for example, an ultraviolet light sensitive ink), and that is used as an authenticity determination code is provided. The code 102 and the group code information 103 are arranged at least at two spots on the card 3, and are arranged at positions that are point-symmetric with respect to the center of the card 3.

The codes 102 are read by the two card information acquisition sensors 21 constituting the card information acquisition sensors 21. The card information acquisition sensor 21 is configured to output an output signal when detecting the marks M (a known ultraviolet light sensitive optical sensor or the like is used). FIG. 8 shows a relation between the outputs of ON signals of the two UV sensors (the electric signal output when the code 102 constituted of the marks M is read) and the marks M. A predetermined combination of the marks M can be identified, based on the comparison result of relative changes in the outputs of the ON signals of the two UV sensors for the codes 102 constituted of the marks M. As a result, in the embodiment shown in FIG. 8, 4 kinds of codes can be configured as the combinations of 2 marks on upper and lower rows, and when 4 rows are printed, 256 kinds of codes can be configured because of the fourth power of 4 kinds. Each of the 52 card kinds of the trump cards is assigned to one of the 256 kinds of codes, and the assignment is stored in the memory or program, as a comparison table. The disposal card information acquisition means 6 identifies each code 102, and thereby, can identify at least the number (rank) of the card 3, based on the previously determined comparison table (not illustrated). It is preferable that the codes 102 be printed with a coating material that is visualized by receiving ultraviolet light, and be printed at positions where the codes 102 do not overlap with kind signs 301 and indexes 302 of the card 3. Further, a space part 303 is provided among the code 102, the group code information 103 and the edge of the card 3. Further, the group code information 103 may be printed at the same spot together with the code 102, with an ink indicating the group code information.

Next, the authenticity determination means 9 that determines the authenticity of the card based on the information about the authenticity of the card 3 will be described. On the card 3 that is the target of the authenticity check, the group code information 103 as the group information that is a code of the information indicating the authenticity of the card 3 and that is configured in an ordinarily invisible state (for example, an ultraviolet light sensitive ink) is provided as described above. The group code information 103, as a code, is composed of a substance or a material itself (for example, an ink or a coating material) that emits lights having different wavelength spectra in response to lights having different wavelengths. The authenticity determination means 9 has a function to perform the authenticity determination of the card 3, that is, the group information acquisition sensor 20 irradiates the group code information 103 with invisible lights having different wavelengths and receives at least two different-wavelength lights of the lights emitted from the group code information 103, and the authenticity determination means 9 determines whether the ratio of the intensities of these lights is the same. A more complex analysis with lights having two or more wavelengths may be performed by receiving lights having different wavelength spectra.

In the reading of the group code information 103, the group information acquisition sensor 20 emits two kinds of ultraviolet lights, and irradiates the group code information 103 printed on the card 3. Then, the group information acquisition sensor 20 receives lights having different wavelength spectra that are emitted by the group code information 103. The control device 14 including the authenticity determination means 9 is constituted by electronic circuits including a microcomputer, a memory and the like, and includes constitutes of an ordinary computer, as exemplified by a CPU, a ROM and a RAM. The control device 14 performs a process to determine the authenticity of the group code information 103.

Each of the following functions configures a part of the invention in the present application, as an improvement of the embodiment.

1) The present invention includes means (dealing shoe) for acquiring at least the information about each number (rank) and the number of cards in the set of several cards dealt on the game table for the use in each game, and the card disposal apparatus and the dealing shoe are connected with a communication device.

2) The present invention has an unfair-behavior check technology of comparing the rank information of each card of the card set obtained from a card dealing device (dealing shoe) and the information of each card of the disposal cards read by the card disposal apparatus, checking whether the two pieces of information coincide, and thereby checking the abnormity of the disposal card in each game.

3) The deck check means acquires the number (rank) information of the cards that remain without being used in each game after being placed on the game table, from the disposal card information acquisition means, counts the number of cards for each card number (rank), with the number (rank) information of cards of each card set that are used in each game and that have been already obtained, and checks whether all cards put in the ejection port are complete in terms of a number equivalent to a predetermined number of decks for each number (rank).

In the above, the embodiments of the present invention have been described. It is natural that the above-described embodiments can be modified within the scope of the present invention by those skilled in the art. For example, the present invention may detect an unfair behavior in games other than the baccarat. In this case, the apparatus in the embodiment may be appropriately modified, if needed in a game to which the present invention is applied.

The invention claimed is:

1. A card disposal apparatus comprising:

a main body including an ejection port configured to receive cards of one or more sets of cards for disposal, the one or more sets of cards including a first set of cards, each set of cards of the one or more sets of cards includes a plurality of decks of cards for use during an individual game, wherein the ejection port:

receives a first portion of the cards from a dealing shoe, the first portion of the cards corresponding to one or more cards dealt during a game play, and receives a second portion of the cards from the dealing shoe, the second portion of the cards corresponding to additional cards not dealt during the game play;

a disposal card stocker configured to be detachable from the main body and including multiple pockets partitioned by multiple partitions, each pocket of the multiple pockets configured to receive, while positioned in a receipt position, a particular set of cards of the one or more sets of cards from the ejection port, the multiple pockets of the disposal card stocker configured to be movable such that, while a first pocket of the multiple pockets is positioned in the receipt position, the other pockets of the multiple pockets are out of the receipt position;

a reading device configured to read a bar code on a package corresponding to the first set of cards, wherein the first set of cards comprises cards that have been shuffled; and a processor configured to:

based on a result of the reading device of reading the bar code on the package, identify that one or more cards received by the ejection port belong to the first set of cards; and for the first set of cards of the one or more sets of cards:

obtain, from at least one sensor, information corresponding to each card of the first set of cards received by the ejection port;

store, based on the obtained information, a count of received cards that the ejection port received, wherein the count of received cards is associated with a combination of a first portion of the first set of cards and a second portion of the first set of cards received by the ejection port; and compare the count to a number of cards of a predetermined number of decks.

2. The card disposal apparatus according to claim 1, wherein a particular pocket of the multiple pockets is further configured to receive and store a portion of the package including the bar code.

3. The card disposal apparatus according to claim 1, wherein the disposal card stocker further comprises a locking device configured to prevent access to one or more cards received by the disposal card stocker.

4. The card disposal apparatus according to claim 1, further comprising:

the least one sensor; and a puncher configured to provide a void in each card received via the ejection port.

5. The card disposal apparatus according to claim 1, wherein:

the count includes a plurality of counts, each of the plurality of counts being of a card type of a plurality of card types of one or more cards of the first set of cards received via the ejection port, and each of the card types corresponds to a particular one of a plurality of rank and suit combinations.

6. The card disposal apparatus according to claim 1, wherein:

the combination of the first portion of the first set of cards and the second portion of the first set of cards includes multiples of each of a plurality of rank and suit combinations, and the card disposal apparatus is configured such that each pocket of the multiple pockets remains continuously in the receipt position from a start of a receipt of the first portion of a respective set of cards until after receipt of all of the second portion of the respective set of cards.

7. The card disposal apparatus according to claim 1, wherein:

the ejection port includes a movable arm configurable into:

a first position over a receiving surface at which one or more of the first portion of the first set of cards are receivable by the ejection port and the second portion of the first set of cards is not receivable as a single stack by the ejection port, and a second position over the receiving surface at which the second portion of the first set of cards is receivable by the ejection port as the single stack; and the processor is configured to determine the count, which is the combination of the first portion of the first set of cards received while the movable arm is in the first position and of the second portion of the first set of cards received as the single stack while the movable arm is in the second position.

8. The card disposal apparatus according to claim 1, wherein:

the package is configured to include the first set of cards prior to the first set of cards being provided to the dealing shoe; and the reading device is configured to read the bar code on the package while the package includes the first set of cards or after the first set of cards are provided to the dealing shoe.

9. A card disposal apparatus comprising:

a body;

an ejection port coupled to the body and configured to, for each set of cards of one or more sets of cards:

receive, one at a time, dealt cards of the set of cards, the dealt cards dealt from a dealing shoe of a game table for use in a game, and subsequent to receipt of the dealt cards, receive undealt cards of the set of cards, the undealt cards remaining in the dealing shoe without being dealt in the game;

a disposal card stocker including multiple pockets configured to be detachable from the body and partitioned by multiple dividers, each pocket of the multiple pockets configured to receive, from the ejection port and while positioned in a receipt position, a particular set of cards of the one or more sets of cards, each set of cards of the one or more sets of cards including a plurality of decks of cards for use during an individual game, the disposal card stocker configured to be movable such that, while a first pocket of the multiple pockets is positioned in the receipt position, the other pockets of the multiple pockets are out of the receipt position; and a reading device configured to read a bar code on a package corresponding to a first set of cards of the one or more sets of cards, wherein the first set of cards comprises cards that have been shuffled;

a processor configured to, for the first set of cards of the one or more sets of cards:

based on a result of the reading device of reading the bar code on the package, identify that one or more cards received by the ejection port belong to the first set of cards;

obtain, from at least one sensor, information corresponding to dealt and undealt cards of the first set of cards received by the ejection port;

store, based on the obtained information, a count of the dealt and undealt cards of the first set of cards that the ejection port received, wherein the count is associated with a combination of the dealt cards of the first set of cards and the undealt cards of the first set of cards received by the ejection port; and compare the count to a card count of first set of cards that was loaded into, and was associated with, the dealing shoe.

10. The card disposal apparatus according to claim 9, wherein:

the count of the dealt and undealt cards of the first set of cards includes a plurality of counts, each of the plurality of counts being of a card type of a plurality of card types of the dealt and undealt cards of the first set of cards received by the ejection port, each of the card types corresponds to a respective one of a plurality of rank and suit combinations, the processor is further configured to determine whether the dealt and undealt cards of the first set of cards received by the ejection port is complete based on comparing each of the counts to the card count of the first set of cards, and the card count of the first set of cards is a stored number that is based on a number of decks included in the first set of cards.

11. The card disposal apparatus according to claim 9, further comprising a puncher configured to generate a void in one or more of the cards received by the ejection port that is determined to be fake.

12. A system comprising:

the card disposal apparatus of claim 9; and the dealing shoe configured to receive at least one set of cards of the one or more sets of cards.

13. The system according to claim 12, further comprising the game table, wherein the dealing shoe is located on a surface of the game table.

14. The card disposal apparatus according to claim 1, wherein the disposal card stocker is configured to rotate about a shaft for movement of the disposal card stocker relative to the main body.

15. The card disposal apparatus according to claim 1, wherein the disposal card stocker is removable from the main body to enable the one or more sets of cards received by the multiple pockets to be removed from the multiple pockets.

16. The card disposal apparatus according to claim 1, wherein the ejection port includes a weight configurable into a plurality of positions over a receiving surface, the plurality of positions including:

a first position configured to provide a space between the weight and the receiving surface into which no more than one card at a time is insertable into the space from outside of the card disposal apparatus in an insertion direction parallel to the receiving surface for placement of the one card on the receiving surface under the weight; and at least one other position configured to provide space between the weight and the receiving surface into which a stack of cards is insertable in the insertion direction as a single unit for placement of the stack of cards on the receiving surface under the weight.

17. The card disposal apparatus according to claim 1, wherein each of the multiple partitions is configured to be arranged substantially orthogonal to a direction of movement of the disposal card stocker relative to the main body.

18. The card disposal apparatus according to claim 1, further comprising a marker configured to mark each of the cards received by the ejection port with a void mark.

19. The card disposal apparatus according to claim 1, wherein:

the multiple pockets are arranged around a center longitudinal axis of the disposal card stocker; and each pocket of the multiple pockets includes an opening at an upper region of a sidewall of the multiple pockets such that, when the pocket is in the receipt position, the opening of the pocket is aligned with a card feeder of the ejection port to receive one or more cards fed by the card feeder, in a direction towards the center longitudinal axis, from the ejection port and through the opening of the pocket into an interior space of the pocket, by which at least one of the one or more cards fed by the card feeder fall in a direction parallel to the center longitudinal axis towards a bottom floor of the pocket.

20. The card disposal apparatus according to claim 19, wherein a lid over the multiple pockets includes, for each pocket of the multiple pockets, a slit over the interior space of the pocket by which the interior space of the pocket is open to an exterior environment on top of the pocket.

21. The card disposal apparatus according to claim 19, wherein the multiple pockets of the disposal card stocker are removable from the main body via a lifting operation associated with the multiple pockets and in a direction parallel to an extension of the center longitudinal axis.

22. The card disposal apparatus according to claim 21, wherein:

the disposal card stocker includes a shaft arranged along the center longitudinal axis around which the multiple pockets are arranged when the opening in the sidewall of one of the multiple pockets is aligned with the card feeder, the shaft extending through a central void around which the multiple pockets are arranged, and the shaft is removable from the central void when the multiple pockets are lifted in the direction parallel to the extension of the center longitudinal axis.

* * * * *